(12) United States Patent
Wolf et al.

(10) Patent No.: US 12,018,960 B1
(45) Date of Patent: Jun. 25, 2024

(54) SENSOR MOUNTING ASSEMBLY

(71) Applicants: Philipp J. Wolf, Capistrano Beach, CA (US); Alyssa J. Garver, Mountain View, CA (US); Brooks G. Marquette, Santa Cruz, CA (US); James J. Dowle, Laguna Beach, CA (US); Jens M. Elfwing, San Jose, CA (US); Romain A. Teil, San Francisco, CA (US); Erik Mikael Fermer, Partille (SE)

(72) Inventors: Philipp J. Wolf, Capistrano Beach, CA (US); Alyssa J. Garver, Mountain View, CA (US); Brooks G. Marquette, Santa Cruz, CA (US); James J. Dowle, Laguna Beach, CA (US); Jens M. Elfwing, San Jose, CA (US); Romain A. Teil, San Francisco, CA (US); Erik Mikael Fermer, Partille (SE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/064,746

(22) Filed: Dec. 12, 2022

Related U.S. Application Data

(63) Continuation of application No. 16/252,770, filed on Jan. 21, 2019, now Pat. No. 11,536,593.

(60) Provisional application No. 62/644,759, filed on Mar. 19, 2018.

(51) Int. Cl.
*B60R 11/00* (2006.01)
*B60R 11/04* (2006.01)
*G01D 11/24* (2006.01)
*G01D 11/30* (2006.01)

(52) U.S. Cl.
CPC ............ *G01D 11/245* (2013.01); *B60R 11/00* (2013.01); *B60R 11/04* (2013.01); *B60R 2011/004* (2013.01); *B60R 2011/0042* (2013.01); *B60R 2011/0052* (2013.01); *B60R 2011/0063* (2013.01); *G01D 11/30* (2013.01)

(58) Field of Classification Search
CPC ...... G01D 11/30; G01D 11/245; B60R 11/04; B60R 11/00
See application file for complete search history.

(56) References Cited

U.S. PATENT DOCUMENTS

| | | | |
|---|---|---|---|
| 9,857,456 B2 * | 1/2018 | Hara ...................... | G01S 17/931 |
| 2007/0182649 A1 * | 8/2007 | Kondou ................. | H01Q 1/325 |
| | | | 343/841 |
| 2016/0282155 A1 * | 9/2016 | Hara ...................... | G01D 11/30 |
| 2016/0291150 A1 * | 10/2016 | Hara ...................... | G01S 17/931 |

(Continued)

FOREIGN PATENT DOCUMENTS

| | | | | | |
|---|---|---|---|---|---|
| CN | 201099212 Y | * | 8/2008 | ............. | H01Q 1/325 |
| CN | 201099212 Y | | 8/2008 | | |
| EP | 2998169 A1 | * | 3/2016 | ........... | B60R 19/483 |

(Continued)

*Primary Examiner* — Jamel E Williams
(74) *Attorney, Agent, or Firm* — Young Basile Hanlon & MacFarlane, P.C.

(57) ABSTRACT

A sensor mounting assembly includes a sensor that is operable to detect conditions, and a body structure having an inner wall and an outer wall located opposite the inner wall. A sensor mount is coupled to the outer wall with at least one fastener extending through the outer wall, inner wall, and sensor mount. The sensor mount defines an internal space in which the sensor is coupled.

21 Claims, 5 Drawing Sheets

(56) References Cited

U.S. PATENT DOCUMENTS

2016/0297437 A1* 10/2016 Hara .................... G01S 7/4813

FOREIGN PATENT DOCUMENTS

| | | | |
|---|---|---|---|
| EP | 2998169 A1 | | 3/2016 |
| JP | 2005238990 A | * | 9/2005 |
| JP | 2006232069 A | * | 9/2006 |
| JP | 2006232069 A | | 9/2006 |

* cited by examiner

SENSOR MOUNTING ASSEMBLY

CROSS-REFERENCE TO RELATED APPLICATION(S)

This application is a continuation of U.S. application Ser. No. 16/252,770, filed on Jan. 21, 2019, which claims the benefit of U.S. Provisional Application No. 62/644,759, filed on Mar. 19, 2018, the contents of which are hereby incorporated by reference in their entirety for all purposes.

TECHNICAL FIELD

This disclosure relates to assemblies for mounting a sensor to a vehicle body structure.

BACKGROUND

Conveyance devices often use sensors to detect a variety of operation conditions including obstacles, device location, temperature, ice, snow, rain, velocity, congestion, etc. Sensors used to detect these conditions are often mounted on the exterior of the body to allow unimpeded sensor detection.

SUMMARY

One aspect of the disclosure is a sensor mounting assembly for a vehicle. The sensor mounting assembly includes a sensor that is operable to detect conditions outside of the vehicle. The assembly also includes a vehicle body structure having an inner wall and an outer wall that is located opposite the inner wall. A sensor mount is coupled to the outer wall with at least one fastener extending through the outer wall, inner wall, and sensor mount. The sensor mount defines an internal space in which the sensor is coupled.

Another aspect of the disclosure is a sensor mounting assembly for a vehicle that includes a sensor that is operable to detect conditions outside of the vehicle and a sensor mount defining an internal space in which the sensor is coupled. The assembly also includes a vehicle body structure including an inner wall and an outer wall located opposite the inner wall. The outer wall includes a depression that is configured to receive at least a portion of the sensor mount. The sensor mount is coupled to the outer wall inside of the depression.

Another aspect of the disclosure is a sensor mounting assembly for a vehicle that includes a sensor that is operable to detect conditions outside of the vehicle. The assembly includes a vehicle body structure having an inner wall having a first aperture and an outer wall having a second aperture. The outer wall is located opposite the inner wall. A sensor mount defines an internal space in which the sensor is coupled. The sensor mount is coupled to the inner wall and the outer wall. The sensor mount may also extend through the first aperture and the second aperture.

DETAILED DESCRIPTION

This disclosure relates to assemblies for mounting sensors to vehicle body structures. Vehicle sensors are often mounted to the exterior of a vehicle body to avoid obstructing the sensors' field of detection; however, exterior sensors increase air resistance acting on the vehicle while in motion and negatively affect the aesthetic appearance of the vehicle. The sensor mounting assemblies disclosed herein mount the sensor to the vehicle body structure. Compared to conventional sensor mounting techniques, the sensor mounting assemblies described herein may provide, as examples, reduced air resistance, reduced aesthetic impacts, better usage of space inside the vehicle body structure, and capacity for larger and/or heavier sensors.

Figure 1:
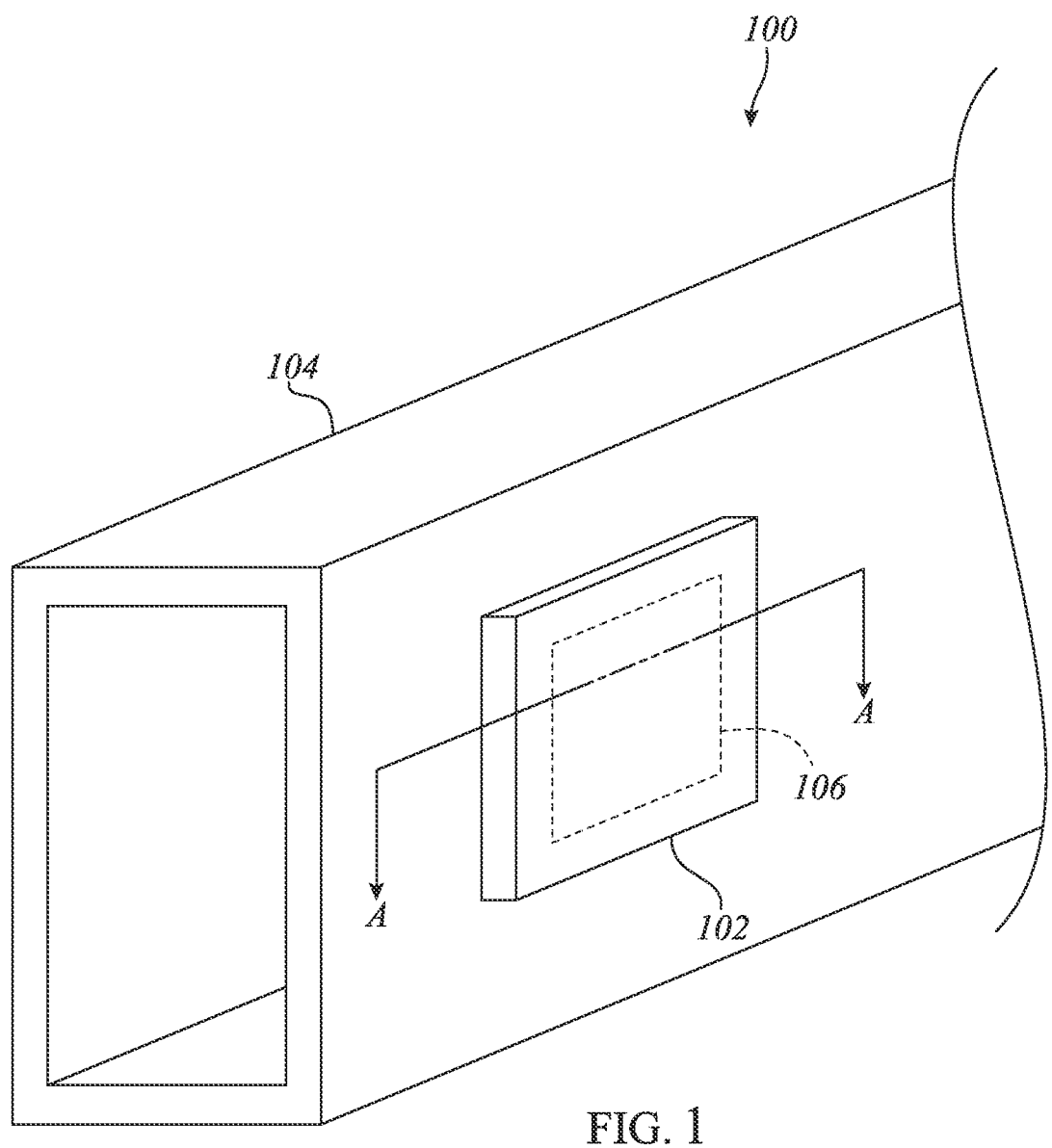
FIG. 1 is a perspective view of a sensor mounting assembly according to a first implementation.

FIG. 1 is a perspective view of a sensor mounting assembly 100 according to a first implementation. The sensor mounting assembly 100 includes a sensor mount 102 coupled to a vehicle body structure 104. The vehicle body structure 104 is a portion of a vehicle, which may be a wheeled road-going vehicle (e.g., an automobile). The sensor mount 102 may define an internal space in which a sensor 106 is coupled. The vehicle body structure 104 may include any portion of a body-in-white, unibody, monocoque, subframe, frame, chassis, or any other vehicle structure. The vehicle body structure 104 may also be hollow or solid. The vehicle body structure 104 may also be made of any plastic, metal, or other suitable material or combination thereof. The sensor 106 may be or include any type of sensing device that is operable to detect conditions outside of the vehicle, such as by measuring incident electromagnetic, radiation, or sound waves. Examples of sensing devices that can be incorporated in the sensor 106 include a visible spectrum camera, an infrared camera, a RADAR sensor, a LIDAR sensor, a structured-light-stereo sensor, or any other sensor, detection, or measurement device. The sensor 106 may also be of any size, shape, material, and may include multiple sensing devices or a combination of varying sensor types.

Figure 2:
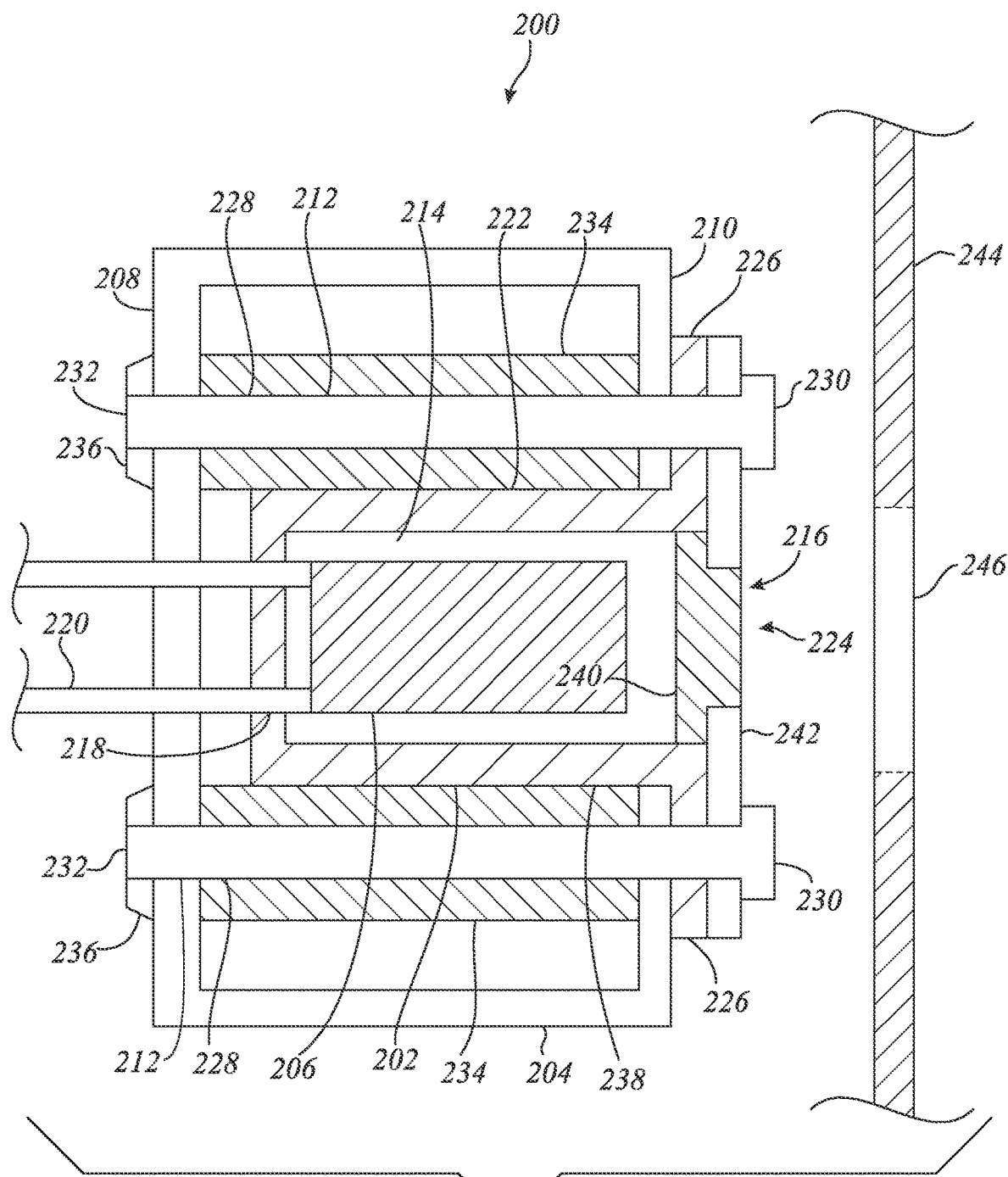
FIG. 2 is a horizontal cross-sectional view taken along line A-A of FIG. 1, showing the sensor mounting assembly.

FIG. 2 is a horizontal cross-sectional view taken along line A-A of FIG. 1, showing the sensor mounting assembly 100. The sensor mounting assembly 300 shown in FIG. 2 is identical to the sensor mounting assembly 100 except as described hereafter. The sensor mounting assembly 300 may include a sensor 206 operable to detect conditions outside of the vehicle and a vehicle body structure 204. The vehicle body structure 204 may include an inner wall 208 and an outer wall 210 located opposite the inner wall 208. The inner wall 208 and the outer wall 210 can form a closed cross-sectional shape with other portions of the vehicle body structure 204 or other components of the sensor mounting assembly 300. The closed cross-sectional shape shown in FIG. 2 that is formed by the inner wall 208 and the outer wall 210 is rectangular, but may be square, round, or any other closed cross-sectional shape.

A sensor mount 202 may be coupled to the outer wall 210 with at least one fastener, such as a fastener 212 that extends through the outer wall 210, inner wall 208, and sensor mount 202. The sensor mount 202 may be coupled to the inner wall 208, the outer wall 210, or both the inner wall 208 and the outer wall 210. The sensor mount 202 may be coupled to the inner wall 208, outer wall 210, or both the inner wall 208 and the outer wall 210 using a rigid or a non-rigid connection. The fastener 212 may be any structure that is configured to couple the sensor mount 202 to the inner wall 208, the outer wall 210, or both the inner wall 208 and the outer wall 210, such as a welded structural member, adhesive, interference fit, bolts, screws, nails, rivets, or any other mechanical fastener. The sensor mount 202 may define an internal space 214 in which the sensor is coupled. The sensor mount 202 and internal space 214 illustrated in FIG. 2 are of a substantially rectangular prismatic shape, but may be cubic, cylindrical, or any other prismatic or amorphous shape. The sensor mount 202 and internal space 214 may be of any size or dimension. The sensor mount 202 and internal space 214 may also be configured to enclose a particular sensor or configured to accommodate the presence of other components or vehicle structures that are independent of the sensor mount 202. The sensor mount 202 may also be of any thickness and may be constructed of any metal, plastic, any other suitable material, or any combination thereof.

The sensor mount 202 may have an opening 216 allowing the sensor 206 to be inserted into and removed from the internal space 214. The opening 216 may be located on a side of the sensor mount 202 opposite the inner wall 208 or may be located anywhere else on the sensor mount 202, such as on a side of the sensor mount 202 opposite the outer wall 210. In some implementations, the opening 216 may not exist and the sensor 206 may be fully enclosed inside the sensor mount 202. In other implementations, the sensor 206 may extend through the opening 216 so that at least a portion of the sensor 206 is external to the internal space 214. In some implementations, a space of any size may also exist between the sensor mount 202 and the inner wall 208. In other implementations, no space exists between the sensor mount 202 and the inner wall 208. The sensor mount 202 and the inner wall 208 may be coupled via welds, adhesive, interference fit, bolts, screws, nails, rivets, or any other mechanical fastener.

The sensor mount 202 may include an aperture 218 through which the sensor 206 can be accessed. A single aperture or multiple apertures may be formed through the sensor mount 202 The aperture 218 may also allow electrical, cooling, or other connections 220 to the sensor 206 through the sensor mount 202 from inside or outside of the vehicle. The outer wall 210 and inner wall 208 may also include apertures that are similar to the aperture 218 allowing access to the sensor 206 and sensor mount 202 through which the connections 220 may extend. The aperture 218 may be located on a side of the sensor mount 202 opposite the outer wall 210, but may be located anywhere on the sensor mount 202. The aperture 218 may be of any size and shape. In some implementations, the sensor mount 202 may include no aperture 218.

The sensor mount 202 may include a sensor retaining portion 222 that defines the internal space 214. The sensor retaining portion 222 shown in FIG. 2 takes the shape of a rectangular prism in which the sensor 206 is retained. The sensor retaining portion 222 can be of a cylindrical, spherical, cubic, or any other prismatic or amorphous shape. The sensor retaining portion 222 may also be configured to correspond to the shape and size of a particular sensor or may be configured to accommodate the presence of other components or vehicle structures that are independent of the sensor retaining portion 222. The sensor retaining portion 222 may enclose the sensor 206, may include the opening 216, or may retain a portion of the sensor 206. The sensor retaining portion 222 may be coupled to the inner wall 208, the outer wall 210, or both the inner wall 208 and the outer wall 210. The sensor retaining portion 222 may be coupled to the inner wall 208, outer wall 210, or both the inner wall 208 and the outer wall 210 using a rigid or a non-rigid connection. The sensor retaining portion 222 may be coupled to the inner wall 208, outer wall 210, or both the inner wall 208 and the outer wall 210 via welds, adhesive, interference fit, bolts, screws, nails, rivets, or any other mechanical fastener.

The sensor retaining portion 222 may be located between the inner wall 208 and the outer wall 210 as shown by FIG. 2. The sensor retaining portion 222 may be of any size, shape, or thickness and may include any of the described features of the sensor mount 202. The sensor retaining portion 222 may extend through an aperture 224 in the outer wall 210. The aperture 224 may be of any size and shape. The aperture 224 may be larger than the sensor retaining portion 222 or may be sized to fit the sensor retaining portion 222. A seal may or may not exist between the outer wall 210 and the sensor retaining portion 222. In some implementations, the aperture 224 may be included in the inner wall 208. In other implementations, the sensor retaining portion 222 may not extend through any aperture 224.

A flange 226 integral with the sensor retaining portion 222 may be coupled to the outer wall 210 along at least a portion of a periphery of the aperture 224. In implementations where the aperture 224 is included in the inner wall 208, the flange 226 may be coupled to the inner wall 208 along at least a portion of a periphery of the aperture 224. In some implementations, the flange 226 may not be integral with the sensor retaining portion 222. The flange 226 may be separately coupled to the sensor retaining portion 222. The flange 226 may also include one or more apertures through which the fastener 212 may extend. The flange 226 illustrated in FIG. 2 is of a rectangular shape, but may be square, round, or any other shape. The flange 226 may be coextensive with a periphery of the aperture 224 in the outer wall 210. The flange 226 may extend around a portion of the periphery of the aperture 224 or around the entire periphery of the aperture 224. The flange 226 may or may not form a seal with the outer wall 210. The flange 226 may be coupled to the outer wall 210 on a side of the outer wall 210 facing the inner wall 208 or on a side of the outer wall 210 opposite the inner wall 208. The flange 226 may also extend any distance away from the aperture 224 and may be of any thickness. The sensor 206, the sensor mount 202, or the sensor retaining portion 222 may or may not be flush with the flange 226. The flange 226 may be coupled to the outer wall 210 via welds, adhesive, interference fit, bolts, screws, nails, rivets, or any other mechanical fastener.

The 212 may extend through the outer wall 210, inner wall 208, and flange 226. In some implementations, the fastener 212 may include a bolt 228 having a head end 230 and a threaded end 232 located opposite the head end 230. The head end 230 may be disposed at the outer wall 210 or at the inner wall 208. The bolt 228 may extend through the flange 226, the outer wall 210, and the inner wall 208. A sleeve 234 may be disposed about the bolt 228 and may extend between the outer wall 210 and the inner wall 208. The sleeve 234 may be cylindrical or any other shape. The sleeve 234 may be made of metal, plastic, or any other material. A nut 236 may be coupled to the threaded end 232 to hold the bolt 228 in place in the sensor mount 202.

In the illustrated example, two occurrences of the fastener 212 are present, each extending through the outer wall 210, inner wall 208, and flange 226. In other implementations, a single fastener or more than two fasteners that are similar to the fastener 212 may extend through the outer wall 210, inner wall 208, and flange 226 around the periphery of the aperture 224. As an example, fasteners that are similar to the fastener 212 may be located on all sides of the flange 226 around the periphery of the aperture 224, and may be equally or unequally spaced from each other and may also be spaced equally or unequally from the aperture 224.

The fastener 212 may also extend through the sensor mount 202 and vehicle body structure 204 at any angle and may be in any orientation relative to the sensor mount 202 and vehicle body structure 204. The fastener 212 may include any type of bolt, rod, nail, screw, rivet, clamp, or other known fastener. The fastener 212 may also be of any size, shape, or thickness, and may be made of any plastic, metal, other suitable material, or combination thereof. In some implementations, the fastener 212 may not extend through the outer wall 210, inner wall 208, and flange 226. For example, the fastener 212 may extend through the flange 226 and the outer wall 210. In other implementations, the sensor mount 202 may not include the fastener 212. In such implementations, the sensor mount 202 may be coupled to the outer wall 210 or inner wall 208 via welds, adhesive, interference fit, or by any other known means of mechanical attachment. In implementations of the sensor mounting assembly 300 that do not include the flange 226, the fastener 212 may extend through the outer wall 210, inner wall 208, and any part of the sensor mount 202.

The sensor retaining portion 222 of the sensor mount 202 may include a peripheral wall 238 integral with the flange 226. The flange 226 may be coupled to the vehicle body structure 204 along the entire periphery of the aperture 224. In some implementations, the flange 226 may be coupled to the vehicle body structure 204 along a portion of the periphery of the aperture 224. The peripheral wall 238 may define the internal space 214. The flange 226 may be coupled to the vehicle body structure 204 by the fastener 212 or by any other fastener or known means of mechanical attachment. In some implementations, the peripheral wall 238 may also be coupled to the vehicle body structure 204 at any portion of the peripheral wall 238 that is not the flange 226. The peripheral wall 238 may have any thickness. In some implementations, the peripheral wall 238 may not be integral with the flange 226.

The sensor mounting assembly 300 may include a cover 240 coupled to the sensor mount 202. The cover 240 may be coupled to the sensor mount 202, the sensor retaining portion 222, the flange 226, the outer wall 210, or the inner wall 208 via interference fit, a hinge, welds, adhesive, bolts, screws, nails, rivets, snap fasteners, or any other type of mechanical fastener. The cover 240 may also be connected to the sensor 206. The cover 240 may enclose the sensor 206 inside the internal space 214 by closing the opening 216. The cover 240 may open and close the opening 216 to allow access to the sensor 206. The cover 240 also may or may not create a seal with the sensor mount 202. The cover 240 may include a signal transmissive material. A signal transmissive material is any material through which a sensor can detect conditions outside of the vehicle. The signal transmissive material may include any type of glass, rubber, plastic, metal, or other material and may be translucent, transparent, or opaque.

The sensor mounting assembly 300 may include an outer plate 242 coupled to the flange 226 and the cover 240 using the fastener 212. The fastener 212 may extend through the outer plate 242, the flange 226, the outer wall 210, and the inner wall 208. In other implementations the outer plate 242 may be coupled to the sensor mount 202 via welds, adhesive, interference fit, bolts, screws, nails, rivets, or any other mechanical fastener. The outer plate 242 may be coupled to a side of the flange 226 opposite the inner wall 208. The outer plate 242 may also retain the cover 240 in place to enclose the sensor 206 inside the internal space 214. The outer plate 242 may include an aperture through which the cover 240 may extend. The cover 240 may be disposed between the sensor 206 and the flange 226, between the sensor and the peripheral wall 238 of the sensor retaining portion 222, between the sensor 206 and the outer plate 242, or between the sensor 206 and the atmosphere. In some implementations the cover 240 may be coupled to the outer plate 242. The cover 240 may be coupled to a side of the outer plate 242 opposite the inner wall 208 or to a side of the outer plate 242 facing the inner wall 208. The outer plate 242 may be sized to cover the cover 240, sensor mount 202, and the flange 226, but may be of any size, shape, or thickness. The outer plate 242 may be made of any rubber, plastic, glass, metal, or any other material or combination thereof. The outer plate 242 may be made of the same or different material as the cover 240, the sensor mount 202, or the flange 226. In some implementations the sensor mounting assembly 300 may not include the outer plate 242.

A body panel 244 may be spaced apart from the outer wall 210 in a direction opposite the inner wall 208. The body panel 244 may be any portion of any vehicle body panel or structure including for example a door panel, fender, hood, quarter panel, or roof panel. The body panel 244 may be mounted to any portion of the vehicle body structure 204 or elsewhere on the vehicle. The body panel 244 may include a signal transmissive material through which the sensor 206 can detect conditions outside of the vehicle. The signal transmissive material may include any type of glass, rubber, plastic, metal, or other material and may be translucent, transparent, or opaque. In other implementations, the body panel 244 may include an aperture 246 through which the sensor 206 can detect conditions outside of the vehicle. The aperture 246 may be of any size or shape and may be at any orientation relative to the sensor 206. In some implementations, a portion of the sensor 206 or the sensor mount 202 may extend through the aperture 246. In some implementations, sensors 206 may be used that are able to detect conditions outside of the vehicle through the body panel 244 without an aperture 246 or signal transmissive material. The body panel 244 may be spaced any distance from the outer wall 210, the sensor mount 202, the flange 226, the cover 240, or the outer plate 242. The space between the body panel 244 and the outer wall 210 also may or may not be uniform. In some implementations, the sensor 206, the sensor retaining portion 222, or the sensor mount 202 may be coupled to the body panel 244.

Figure 3:
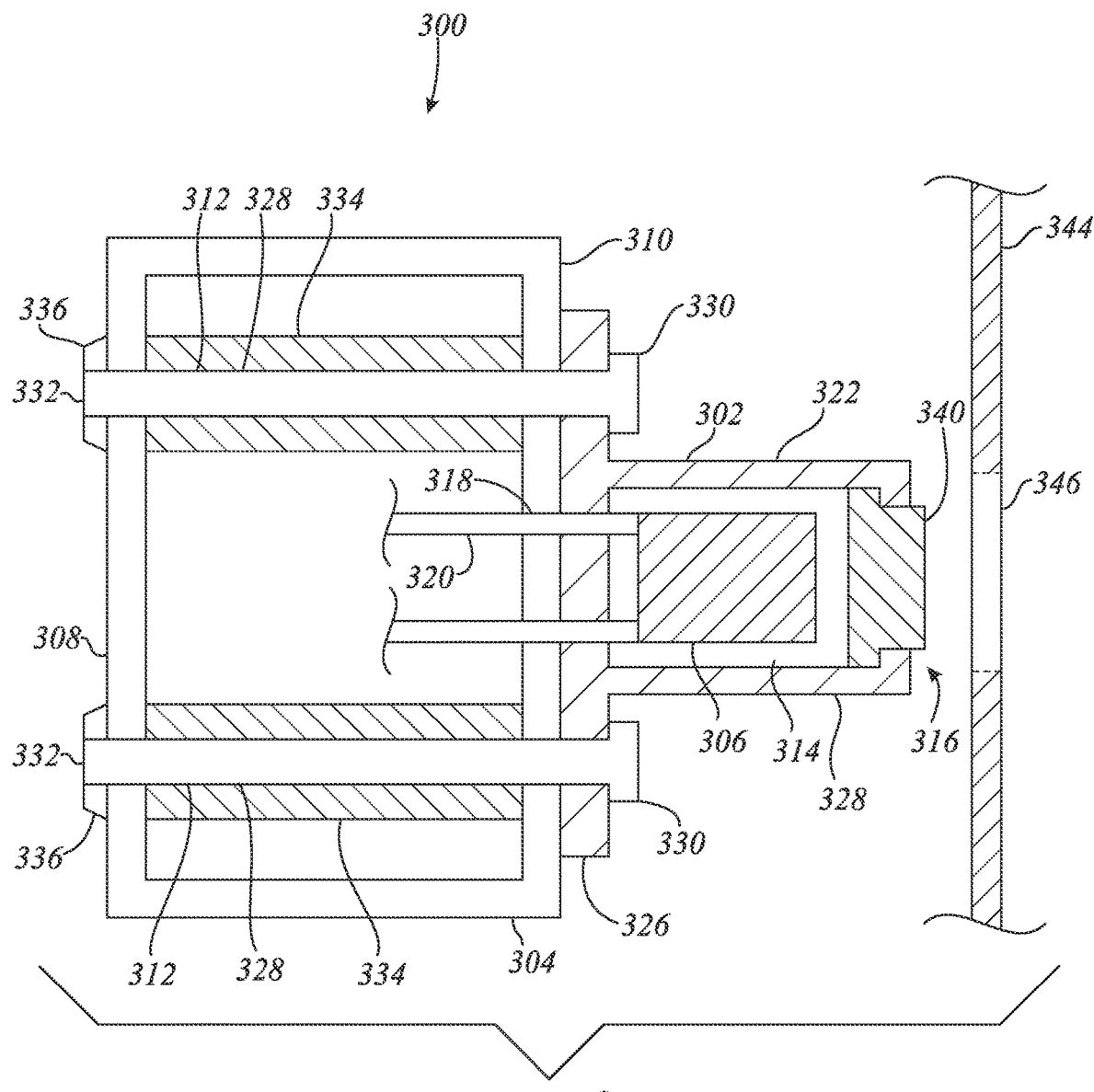
FIG. 3 is a horizontal cross-sectional view of a sensor mounting assembly according to a second implementation in which a sensor retaining portion extends away from an outer wall in a direction opposite an inner wall.

FIG. 3 is a horizontal cross-sectional view of a sensor mounting assembly 300 according to a second implementation in which the sensor retaining portion 322 extends away from the outer wall 310 in a direction opposite the inner wall 308. The sensor mounting assembly 300 shown in FIG. 3 is identical to the sensor mounting assembly 100 except as described hereafter. The sensor retaining portion 322 may extend away from the outer wall 310 in a direction opposite from the inner wall 308. In such implementations the sensor mount 302, sensor 306, outer plate 342, and the cover 340 may be located between the outer wall 310 and the body panel 344. The end of the sensor retaining portion 322 opposite the outer wall 310 may extend any distance from the outer wall 310. There may or may not be a space between the sensor retaining portion 322 and the body panel 344. The sensor mount 302 and the outer wall 310 may be coupled using a rigid or a non-rigid connection.

Figure 4:
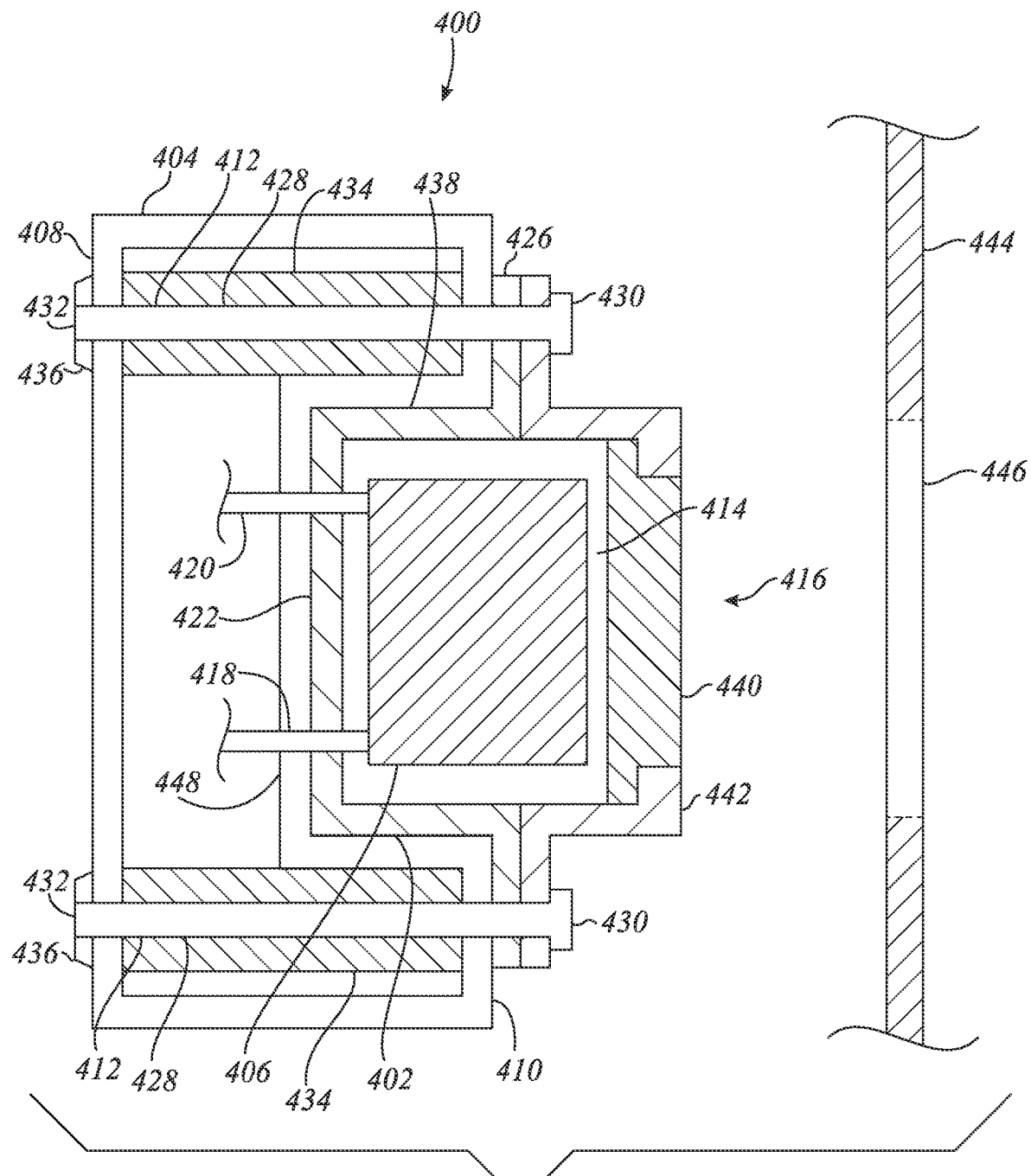
FIG. 4 is a horizontal cross-sectional view of a sensor mounting assembly according to a third implementation.

FIG. 4 is a horizontal cross-sectional view of a sensor mounting assembly 400 according to a third implementation. The sensor mounting assembly 400 shown in FIG. 4 is identical to the sensor mounting assembly 100 except as described hereafter. The sensor mounting assembly 400 may include a vehicle body structure 404 having an inner wall 408 and an outer wall 410 located opposite the inner wall 408. The outer wall 410 may include a depression 448 shaped and sized to receive at least a portion of the sensor mount 402. In some implementations, the inner wall 408 may include the depression 448. The depression 448 shown in FIG. 4 is of a substantially rectangular prismatic shape, but it may be cubic, cylindrical, or any other prismatic or amorphous shape. The depression 448 may also have a size and shape that are configured according to the geometry of the sensor mount 402. The depression 448 may retain the entirety of the sensor mount 402 or a portion of the sensor mount 402. The sensor mount 402 may be coupled to the outer wall 410 inside of the depression 448. The sensor mount 402 and the outer wall 410 may be coupled via welds, adhesive, interference fit, bolts, screws, nails, rivets, or any other mechanical fastener. The sensor mount 402 and the outer wall 410 may be coupled using a rigid or a non-rigid connection.

The sensor mount 402 may include a peripheral wall 438 coupled to the outer wall 410 of the vehicle body structure 404. The peripheral wall 438 may define the internal space 414. The sensor mount 402 may also include a cover 440 coupled to the sensor mount 402. The cover 440 may enclose the sensor 406 inside the internal space 414 and may include a signal transmissive material. The peripheral wall 438 may be coupled to the outer wall 410 inside of the depression 448 in the outer wall 410. In some implementations, the inner wall 408 of the vehicle body structure 404 may include the depression 448 and the peripheral wall 438 may be coupled to the inner wall 408 inside of the depression 448. In such an implementation, at least a portion of the sensor mount 402 may be between the inner wall 408 and the outer wall 410. In other implementations, both the inner wall 408 and the outer wall 410 may include depressions 448 opposite each other and the peripheral wall 438 may be coupled to the inner wall 408 and the outer wall 410 inside the depressions 448. The peripheral wall 438 may have any thickness. The sensor mount 402 may have the same features as the sensor mount 202 previously described.

The sensor mount 402 may also include a sensor retaining portion 422 that defines the internal space 414. The sensor retaining portion 422 may be coupled to the outer wall 410 inside of the depression 448. In other implementations, the sensor retaining portion 422 may be coupled to the inner wall 408 inside a depression 448 in the inner wall 408. The sensor retaining portion 422 may have the same features as the sensor retaining portion 422 previously described.

A flange 426 may be integral with the sensor retaining portion 422 and may be coupled to the outer wall 410 outside of the depression 448. In some implementations, the flange 426 may not be integral with the sensor retaining portion 422 but may be separately coupled to the sensor retaining portion 422. The flange 426 may be coupled to the outer wall 410 along a portion of a periphery of the depression 448 or may be coupled to the outer wall 410 along the entire periphery of the depression 448. The flange 426 may extend any distance away from the depression 448. The flange 426 may have the same features as the flange 226 previously described. At least one fastener, such as a fastener 412, may extend through the flange 426, the outer wall 410, and the inner wall 408. The fastener 412 may have the same features as the fastener 212 previously described.

In some implementations, the sensor mount 402 and a portion of the outer wall 410 inside the depression 448 may include at least one aperture, such as an aperture 418 through which the sensor 406 can be accessed from outside the internal space 414. In some implementations, the aperture 418 may be located on the sensor mount 402 on the portion of the sensor mount 402 coupled to the depression 448. In other implementations the aperture 418 may be located elsewhere on the sensor mount 402, such as on a side of the sensor mount 402 located opposite the outer wall 410. In implementations where the sensor mount 402 is coupled to a depression 448 in the inner wall 408, the aperture 418 may be located on the outer wall 410 or the inner wall 408. Like the sensor mounting assembly 300, the aperture 418 may also allow electrical, cooling, or other connections 420 to the sensor 406 through the sensor mount 402 from inside or outside of the vehicle.

Figure 5:
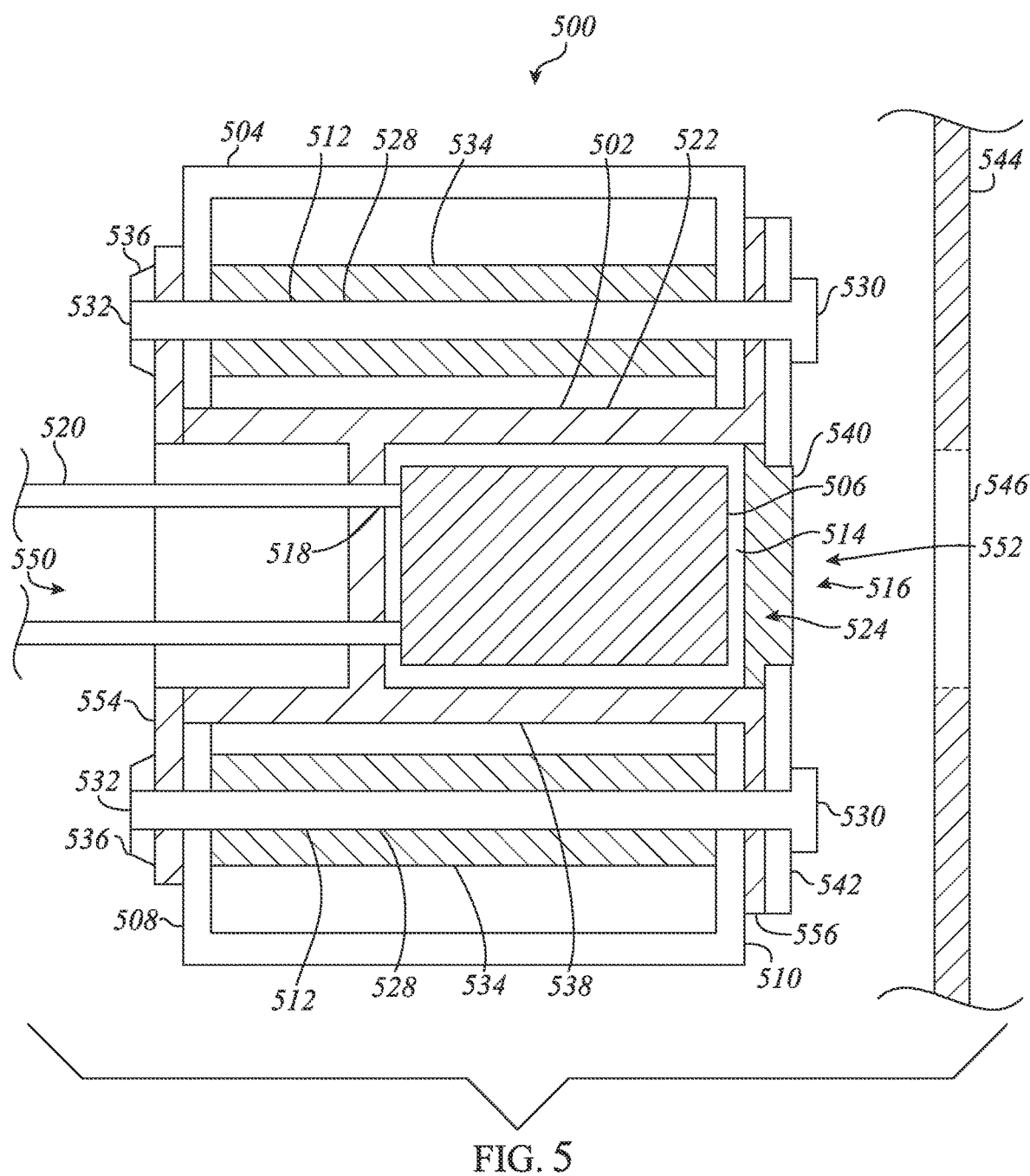
FIG. 5 is a horizontal cross-sectional view of a sensor mounting assembly according to a fourth implementation.

FIG. 5 is a horizontal cross-sectional view of a sensor mounting assembly 500 according to a fourth implementation. The sensor mounting assembly 500 shown in FIG. 5 is identical to the sensor mounting assembly 100 except as described hereafter. The sensor mounting assembly 500 may include a sensor 506 operable to detect conditions outside of the vehicle. A vehicle body structure 504 may include an inner wall 508 having a first aperture 550 and an outer wall 510 having a second aperture 552. The first aperture 550 may be located opposite the second aperture 552. The outer wall 510 may be located opposite the inner wall 508. A sensor mount 502 may define an internal space 514 in which the sensor 506 is coupled. The sensor mount 502 may be coupled to the inner wall 508 and the outer wall 510, and the sensor mount 502 may extend through the first aperture 550 and the second aperture 552. The sensor mount 502 may be coupled to the inner wall 508 and the outer wall 510 using a rigid or a non-rigid connection. The first aperture 550 and the second aperture 552 may be of any size or shape. The first aperture 550 and the second aperture 552 may be larger than the sensor mount 502 or may be sized to fit the sensor mount 502. A seal may or may not exist between the outer wall 510 and the sensor mount 502 or the inner wall 508 and the sensor mount 502. The first aperture 550 and the second aperture 552 may be the same shape and size or different shapes or sizes.

The sensor mount 502 may include a sensor retaining portion 522 extending through the first aperture 550 and the second aperture 552. The sensor retaining portion 522 may define an internal space 514 in which the sensor 506 is coupled. The sensor mount 502 may include a first flange 554 coupled to the inner wall 508 along at least a portion of a periphery of the first aperture 550. The sensor mount 502 may also include a second flange 556 coupled to the outer wall 510 along a least a portion of a periphery of the second aperture 552. The first flange 554 and the second flange 556 may or may not be integral with the sensor mount 502. The first flange 554 may be coupled to the inner wall 308 and the second flange 556 may be coupled to the outer wall 510 via welds, adhesive, interference fit, bolts, screws, nails, rivets, or any other mechanical fastener. The first flange 554 and the second flange 556 may have the same features as the flange 226 previously described.

At least one fastener, such as a fastener 512, may extend through the first flange 554, inner wall 508, outer wall 510, and second flange 556. The fastener 512 may have the same features as the fastener 212 previously described.

The sensor retaining portion 522 of the sensor mount 502 may include a peripheral wall 538 integral with the first flange 554 and the second flange 556. The first flange 554 and the second flange 556 may or may not be integral with the peripheral wall 538 or the sensor mount 502. The first flange 554 and the second flange 556 may or may not have the same size, shape, orientation, or thickness. The first flange 554 may be coupled to the inner wall 508 and the second flange 556 may be coupled to the outer wall 510. The first flange 554 and the second flange 556 may have the same features as the flange 226. The peripheral wall 538 may define the internal space 514. The peripheral wall 538 may have any thickness. The sensor retaining portion 522 may include the same features as the sensor retaining portion 222 previously described.

As described above, one aspect of the present technology is the gathering and use of data by detecting conditions for use in vehicle control. The present disclosure contemplates that in some instances, this gathered data may include personal information data or can be used to identify personal information data that uniquely identifies or can be used to contact or locate a specific person, such as by capturing an image that depicts a person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, capturing images that depict the surroundings of a vehicle can be useful to detect objects near the vehicle and to control motion of the vehicle with respect to the objects. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to use personal information data. In yet another example, users can select to limit the length of that user personal information data is maintained or entirely prohibit the storage of personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images collected by sensors can be filtered to make persons unrecognizable.

What is claimed is:

1. A sensor mounting assembly for a vehicle, comprising:
a sensor operable to detect conditions outside of the vehicle; and
a sensor mount coupled to an outer wall of a vehicle body, with at least one fastener extending through the outer wall and the sensor mount, and with the fastener extending at least partially through an inner wall of the vehicle body, located opposite the outer wall,
wherein the sensor mount is concave and defines an internal space therein, within which the sensor is coupled.

2. The sensor mounting assembly of claim 1, further comprising:
a body panel spaced apart from the outer wall in a direction opposite the inner wall, wherein the body panel includes a signal transmissive material through which the sensor can detect conditions outside of the vehicle, wherein the sensor mount comprises:
a sensor retaining portion that defines the internal space, wherein the sensor retaining portion extends through an aperture in the outer wall, and at least part of the sensor retaining portion is located between the inner wall and the outer wall; and
a flange that is integral with the sensor retaining portion and coupled to the outer wall along at least a portion of a periphery of the aperture, wherein the at least one fastener extends through the flange, and
wherein:
the sensor retaining portion of the sensor mount includes a peripheral wall that is integral with the flange,
the flange is coupled to the vehicle body along an entirety of the periphery of the aperture, and
the peripheral wall defines the internal space.

3. The sensor mounting assembly of claim 1, wherein the sensor mount includes:
a sensor retaining portion that defines the internal space, wherein the sensor retaining portion extends through an aperture in the outer wall; and
a flange that is integral with the sensor retaining portion and coupled to the outer wall along at least a portion of a periphery of the aperture, wherein the at least one fastener extends through the flange.

4. The sensor mounting assembly of claim 3, wherein at least part of the sensor retaining portion is located between the inner wall and the outer wall.

5. The sensor mounting assembly of claim 3, wherein the sensor retaining portion of the sensor mount includes a peripheral wall that is integral with the flange, the flange is coupled to the vehicle body along an entirety of the periphery of the aperture, and the peripheral wall extends around the internal space.

6. The sensor mounting assembly of claim 1, wherein the sensor mount includes:
a sensor retaining portion that defines the internal space, wherein the sensor retaining portion extends away from the outer wall in a direction opposite from the inner wall; and
a flange that is integral with the sensor retaining portion and coupled to the outer wall, wherein the at least one fastener extends through the outer wall, the inner wall, and the flange.

7. The sensor mounting assembly of claim 1, wherein the sensor mount includes at least one aperture through which the sensor can be accessed from outside the internal space.

8. The sensor mounting assembly of claim 1, further comprising:
a cover coupled to the sensor mount, wherein the cover encloses the sensor inside the internal space, and wherein the cover includes a signal transmissive material.

9. The sensor mounting assembly of claim 1, further comprising:
a body panel spaced apart from the outer wall in a direction opposite the inner wall, wherein the body panel includes a signal transmissive material through which the sensor can detect conditions outside of the vehicle.

10. The sensor mounting assembly of claim 1, further comprising:
a body panel spaced apart from the outer wall in a direction opposite the inner wall, wherein the body panel includes an aperture through which the sensor can detect conditions outside of the vehicle.

11. A vehicle comprising:
a sensor operable to detect conditions outside of the vehicle;
a sensor mount that is recessed and defines an internal space therein, within which the sensor is coupled;
a vehicle body including an inner wall and an outer wall located opposite the inner wall, wherein the outer wall defines an aperture through which the sensor mount extends such that the sensor mount is at least partially disposed between the inner wall and the outer wall, wherein the sensor mount is coupled to the outer wall, and wherein the sensor mount includes a flange coupled to the outer wall; and
at least one fastener extending through the flange, the outer wall, and the inner wall.

12. The vehicle of claim 11, wherein the sensor mount includes:
a peripheral wall coupled to the outer wall of the vehicle body, wherein the peripheral wall extends around the internal space; and
a cover coupled to the sensor mount, wherein the cover encloses the sensor inside the internal space and includes a signal transmissive material.

13. The vehicle of claim 11, wherein the sensor mount includes:
a sensor retaining portion that defines the internal space, and
wherein the flange is integral with the sensor retaining portion and is coupled to the outer wall along at least a portion of a periphery of the aperture.

14. The vehicle of claim 11, comprising a body panel spaced apart from the outer wall in a direction opposite the inner wall, wherein the body panel includes a signal transmissive material through which the sensor can detect conditions outside of the vehicle.

15. A vehicle comprising:
a sensor operable to detect conditions outside of the vehicle;
a sensor mount that is concave and defines an internal space therein, within which the sensor is coupled;
a vehicle body including an inner wall and an outer wall located opposite the inner wall, wherein the sensor mount is disposed on the outer wall and extends in a direction opposite from the inner wall; and
at least one fastener extending through the outer wall and the sensor mount to couple the sensor mount to the outer wall.

16. The vehicle of claim 15, wherein the sensor mount includes:
a sensor retaining portion that defines the internal space; and
a flange that is integral with the sensor retaining portion and coupled to the outer wall, with the sensor retaining portion extending from the flange in the direction opposite from the inner wall.

17. The vehicle of claim 16, wherein the at least one fastener extends through the flange of the sensor mount to secure the sensor mount to the outer wall.

18. The vehicle of claim 15, wherein the at least one fastener extends through the inner wall.

19. The vehicle of claim 15, comprising a body panel spaced apart from the outer wall in the direction opposite the inner wall, wherein the body panel includes a signal transmissive material through which the sensor can detect conditions outside of the vehicle.

20. A vehicle comprising:

a sensor operable to detect conditions outside of the vehicle;

a sensor mount defining an internal space in which the sensor is coupled, and including a peripheral wall that extends around the internal space; and a vehicle body including an inner wall and an outer wall located opposite the inner wall, wherein the outer wall defines an aperture through which the sensor mount extends such that the sensor mount is at least partially disposed between the inner wall and the outer wall, and wherein the peripheral wall of the sensor mount is coupled to the outer wall of the vehicle body; and a cover coupled to the sensor mount, wherein the cover encloses the sensor inside the internal space and includes a signal transmissive material.

21. A vehicle comprising:

a sensor operable to detect conditions outside of the vehicle;

a sensor mount defining an internal space in which the sensor is coupled; and a vehicle body including an inner wall and an outer wall located opposite the inner wall, wherein the outer wall defines an aperture through which the sensor mount extends such that the sensor mount is at least partially disposed between the inner wall and the outer wall, and wherein the sensor mount is coupled to the outer wall; and a body panel spaced apart from the outer wall in a direction opposite the inner wall, wherein the body panel includes a signal transmissive material through which the sensor can detect conditions outside of the vehicle.

* * * * *